(12) United States Patent
Shin et al.

(10) Patent No.: US 6,784,779 B2
(45) Date of Patent: Aug. 31, 2004

(54) INDUCTOR EMPLOYING CARBON NANOTUBE AND/OR CARBON NANOFIBER

(75) Inventors: Jin Koog Shin, Seoul (KR); Gyu Tae Kim, Seoul (KR); Hak Su Kim, Suwon (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/888,559

(22) Filed: Jun. 26, 2001

(65) Prior Publication Data

US 2002/0003463 A1 Jan. 10, 2002

(30) Foreign Application Priority Data

Jul. 8, 2000 (KR) .......................................... 2000-39122

(51) Int. Cl.[7] ................................................ H01F 5/00
(52) U.S. Cl. .......................... 336/200; 336/83; 257/531
(58) Field of Search ...................... 336/83, 200; 257/22, 257/415, 445, 445 B, 531

(56) References Cited

U.S. PATENT DOCUMENTS 6,157,043 A * 12/2000 Miyamoto ................... 257/531
6,183,714 B1 * 2/2001 Smalley et al. ........... 423/447.3

* cited by examiner

Primary Examiner—Tuyen T. Nguyen
(74) Attorney, Agent, or Firm—Morgan, Lewis & Bockius LLP

(57) ABSTRACT

Disclosed is an inductor, which employs carbon nanotubes and/or carbon nanofibers synthesized in a shape of coils, so that the inductor has a high inductance even in a minute circuit of a nano-size or a micro-size. The inductor may have a carbon nanotube and/or carbon nanofiber synthesized in a shape of a coil, in which the carbon nanotube and/or carbon nanofiber is synthesized between catalysts fixed at desired locations on

8 Claims, 5 Drawing Sheets

INDUCTOR EMPLOYING CARBON NANOTUBE AND/OR CARBON NANOFIBER

BACKGROUND OF THE INVENTION

1. Field of the Invention

The present invention relates to an inductor, which can be utilized as an element in a minute circuit of nano-size or micro-size, and more particularly to an inductor, which employs carbon nanotubes and/or carbon nanofibers synthesized in a shape of coils, so that the inductor has a high inductance even in a minute circuit of a nano-size or a micro-size.

2. Description of the Related Art

Nowadays, electronic goods such as a mobile phone and a microcomputer have a tendency to be highly integrated and miniaturized, so that a miniaturization of elements of the electronic goods has been a big subject.

In an electronic circuit, an inductor, a resister, and a capacitor can be presented as three big passive elements, in which it is relatively easy to miniaturize the resistor and the capacitor. However, in the case of the inductor, it is very difficult to miniaturize the inductor due to its complicated configuration.

FIG. 1 is a view for showing the construction of a chip inductor employing a coil configuration by means of a conventional patterning method.

In the conventional chip inductor 1 and 2, as shown in FIG. 1, the coil configuration has been artificially formed by means of a patterning, so as to obtain an inductance. However, due to the limitation in its performance, it has been impossible to achieve an inductor having a high inductance.

Further, there is another method of manufacturing an inductor of micro-size, which utilizes the techniques of multi-layer or micro electro mechanical system (MEMS), but this method is problematic in the aspects of performance and cost. Accordingly, in progress is a research for developing new materials to be used in an inductor and methods of manufacturing the inductor.

Meanwhile, an inductance is a phenomenon induced by a back electromotive force of an electric conductor surrounding a medium having a predetermined magnetic permeability. In this case, when a winding has a high resistance, the Joule heat is generated due to the resistance, so that the resistance R component rather than the inductance L component is increased. Therefore, the winding has to be made of materials having a small resistance, so that a high electric current can pass through the winding.

Further, in order to achieve a micro element having a high inductance, the element has go have a configuration of a coil, which has a high electric conductivity in the narrow element, and has to be capable of easily preserving the magnetic energy. Accordingly, there has been a strong requirement for a development of an element provided with these characteristics.

SUMMARY OF THE INVENTION

Accordingly, the present invention has been made in an effort to solve the problems occurring in the related art, and it is an object of the present invention to provide an inductor, which employs carbon nanotubes and/or carbon nanofibers synthesized in a shape of coils, so that the inductor has a high inductance even in a minute circuit of a nano-size or a micro-size.

In accordance with one aspect, the present invention provides an inductor comprising a carbon nanotube and/or carbon nanofiber synthesized in a shape of a coil, in which the carbon nanotube and/or carbon nanofiber is synthesized between catalysts fixed at desired locations on a substrate.

In accordance with another aspect, the present invention provides an inductor. comprising an aggregate of carbon nanotubes and/or carbon nanofibers, in which the carbon nanotubes and/or carbon nanofibers respectively synthesized in a shape of coils are compressed.

In accordance with another aspect, the present invention provides an inductor comprising a complex of carbon nanotubes and/or carbon nanofibers and a matrix such as an insulator, a ceramic, and a semiconductor, the carbon nanotubes and/or carbon nanofibers being synthesized respectively in a shape of a coil.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

The above and other objects, characteristics, and advantages of the present invention will be apparent from the following description along with the accompanying drawings.

In general, a catalyst is required in a process of synthesizing carbon nanotubes and/or carbon nanofibers. Further, by properly controlling the size and the shape of the catalyst, the carbon nanotubes and/or carbon nanofibers, which respectively grow at different crystal faces of the catalyst, can be entangled with each other. In result, the carbon nanotubes and/or carbon nanofibers can be grown in a shape of a coil. This is a phenomenon, which is related to the surface index of an exposed crystal face of the catalyst, because the conditions, under which carbon and hydrogen physically and chemically adsorbed onto the catalyst are deposited and grown, are different according to the crystal faces of the catalyst.

In detailed description, the catalyst exists in a shape of a polyhedron whose crystal faces have different physical properties, so that the different crystal faces have different characteristics of adsorption, which make the deposition and the growth of carbon on the different faces be different from each other. In result, the carbon nanotubes and/or carbon nanofibers in three directions, which have different growing speed, are consequently twisted and entangled to have a shape of a coil. In this case, the shape of growing carbon nanotubes and/or carbon nanofibers has a close relation to the quantity of flow, the mixing ratio, and the composition of the used gas.

In the meantime, iron Fe, nickel Ni, cobalt Co, or alloy of them is utilized as the catalyst in the manufacturing process as described above. Therefore, in the case of utilizing the grown carbon nanotubes and/or carbon nanofibers for an inductor, there is no need for an additional purification step for eliminating the transition metal used as the catalyst as described above.

Figure 1:
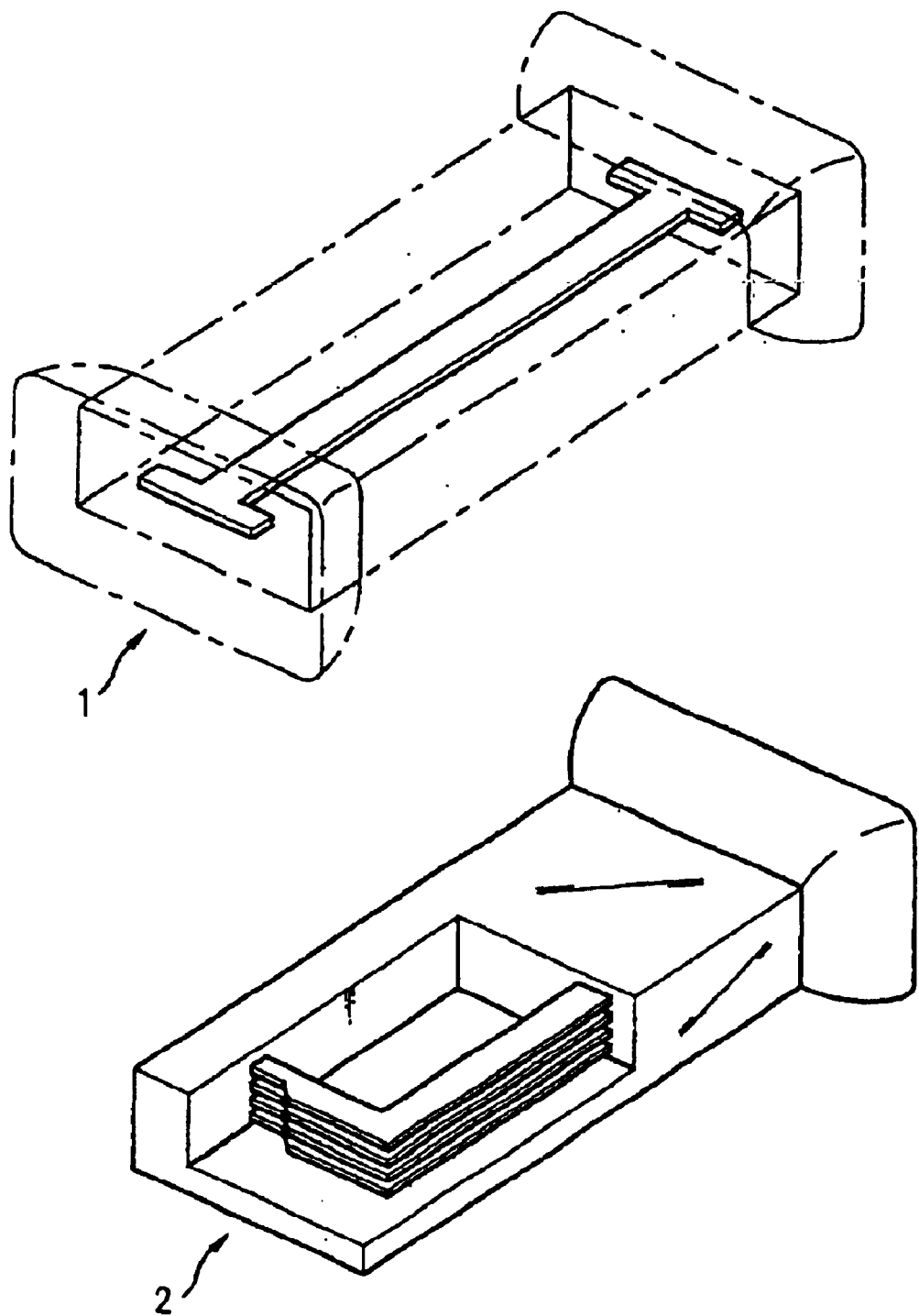
FIG. 1 is a view for showing the construction of a chip inductor employing a coil configuration by means of a conventional patterning method.
Figure 2:
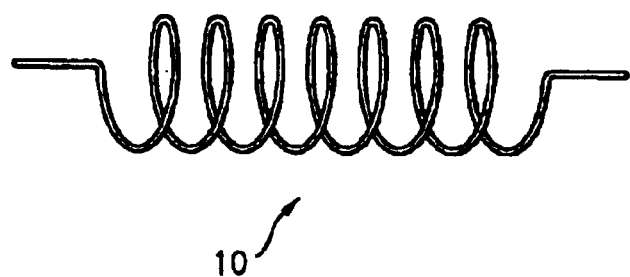
FIG. 2 is a view for showing an inductor employing a carbon nanotube and/or carbon nanofiber according to an embodiment of the present invention.

FIG. 2 is a view for showing an inductor employing a carbon nanotube and/or carbon nanofiber according to an embodiment of the present invention.

This figure shows the case where a grown carbon nanotube and/or carbon nanofiber 10 itself is used as an inductor. In this case, the number of winding times per a unit length and the thickness of the growing coil of the carbon nanotube and/or carbon nanofiber 10 can be controlled by controlling the condition of synthesis. Accordingly, when the carbon nanotube and/or carbon nanofiber 10 in the shape of coil alone is used an inductor, the inductor can have various values of inductance with the same length.

In the meantime, a thermal decomposition process of acetylene can be utilized as a method of manufacturing the carbon nanotube 10. In a real execution of this method by the present inventor, powder of cobalt and nickel has been used as catalysts, and a small quantity of thiophene has been added to the acetylene gas according to necessity. Further, the manufacturing process has been performed in a temperature range between 680 and 1,000° C.

To describe an example of the synthesis process more detailedly, nickel powder of twenty nanometers has been ready and contained in a quartz boat. Further, the boat has been put in the middle of a tube (a reactor) of a horizontal tube furnace (an electric furnace), and hydrogen has been infected into the tube for fifteen minutes at a temperature between 680 and 1500° C. Thereafter, hydrogen and acetylene $C_2H_2$ have been injected respectively by forty cubic centimeters (cc) and by ten cc per one minute in a mixed state. In this case, the partial pressures of the hydrogen and the acetylene have been maintained respectively at 48,000 Pascal (0.47 atmospheric pressure) and 6,650 Pascal (0.07 atmospheric pressure). Through the process as described above, the present inventor could grow a carbon nanotube having a shape of a coil.

Beside of the thermal decomposition process as described above, another method such as a catalyst thermal decomposition method, a plasma vapor deposition method, and a hot-filament vapor deposition method can be utilized, and a compound of hydrocarbon such as methane, acetylene, carbon monoxide, benzene, and ethylene can be used as a raw material.

Figure 3:
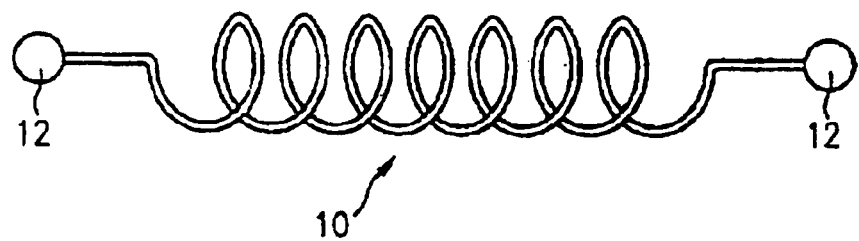
FIG. 3 is a view for showing an inductor according to another embodiment of the present invention, which employs a carbon nanotube and/or carbon nanofiber grown between catalysts at specific locations.

Meanwhile, FIG. 3 is a view for showing an inductor according to another embodiment of the present invention, which employs a carbon nanotube and/or carbon nanofiber grown between catalysts at specific locations. That is, as shown, proper catalysts 12 are fixed at desired locations of a substrate, and a carbon nanotube and/or carbon nanofiber 10 is synthesized between the catalysts and is grown to be used as an inductor.

In this case, the carbon nanotube and/or carbon nanofiber 10 can be manufactured by means of a thermal decomposition method, a catalyst thermal decomposition method, a plasma vapor deposition method, and a hot-filament vapor deposition method.

Figure 4:
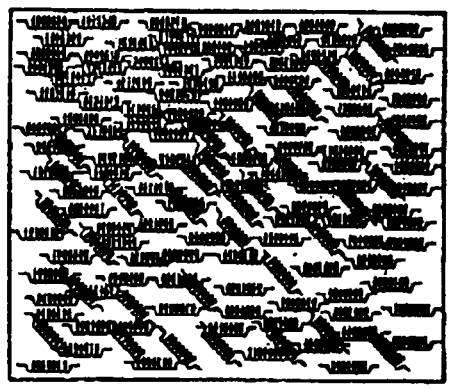
FIG. 4 is a view for showing an inductor according to another embodiment of the present invention, which employs an aggregate of carbon nanotubes and/or carbon nanofibers.

Further, FIG. 4 is a view for showing an inductor employing an aggregate of carbon nanotubes and/or carbon nanofibers according to another embodiment of the present invention. In the inductor, a coil aggregate 20 containing a plurality of carbon nanotubes and/or carbon nanofibers is formed to be used as the inductor.

In the case of using an inductor formed as the coil aggregate 20 as described above, the inductor can have a higher inductance value in comparison with the case of a single coil. Further, in synthesizing the coil aggregate 20 as described above, carbon nanotubes and/or carbon nanofibers are firstly synthesized, and then the synthesized carbon nanotubes and/or carbon nanofibers are compressed, so that the coil aggregate 20 is formed.

Figure 5:
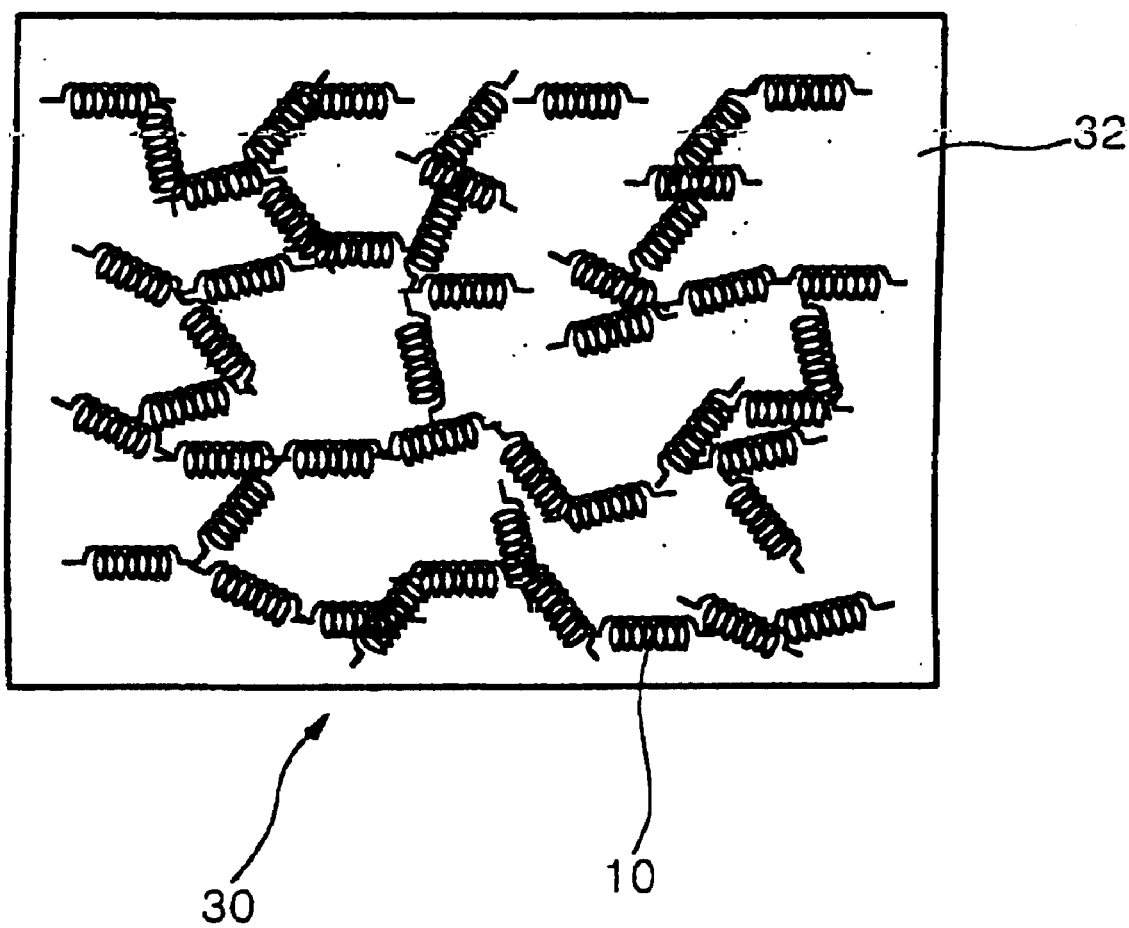
FIG. 5 is a view for showing an inductor according to another embodiment of the present invention, which employs a complex of a matrix and carbon nanotubes and/or carbon nanofibers.

Further, FIG. 5 is a view for showing an inductor according to another embodiment of the present invention, which employs a complex of a matrix and carbon nanotubes and/or carbon nanofibers.

In the inductor, carbon nanotubes and/or carbon nanofibers 10 and a matrix 32 such as an insulator, a ceramic, and a semiconductor are formed into a complex 30, which is used as the inductor. In synthesizing the complex 30 as described above, carbon nanotubes arid/or carbon nanofibers 10 are firstly synthesized, and then the synthesized carbon nanotubes and/or carbon nanofibers 10 are compressed in the matrix 32, so that the complex 30 is formed.

In this case, the conduction of electricity is carried out by the carbon nanotubes and/or carbon nanofibers having the shape of coils, and the matrix 32 functions only to adjust the number of coils per unit volume. That is, in the inductor having the construction as described above, an inductance of a desired band can be achieved by adjusting the ratio of compounding the matrix 32 and the carbon nanotubes and/or carbon nanofibers 10 in the shape of coil.

In the case of the complex 30 as shown in FIG. 5, electric interconnections between the distributed carbon nanotubes and/or carbon nanofibers 10 have to be secured, which may be calculated by the percolation theory. According to the calculation, it is noticed that three-dimensional electric interconnections are achieved in a range of one-several tenth to a few weight percent (wt %). Further, since the carbon nanotubes and/or carbon nanofibers have a high aspect ratio, the interconnection between the carbon nanotubes and/or carbon nanofibers can be enabled by adding even an extremely small quantity of them.

Figure 6:
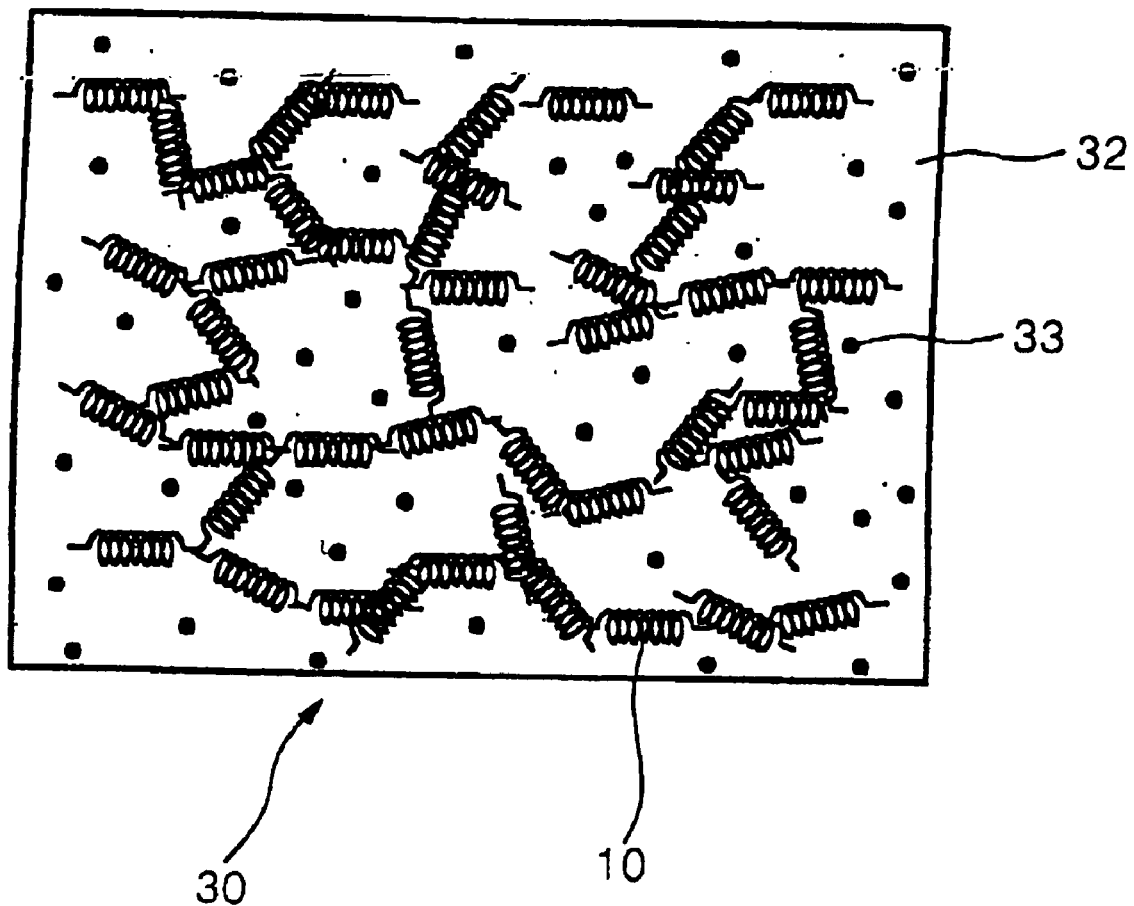
FIG. 6 is a view for showing an inductor according to another embodiment of the present invention, which employs a complex of a matrix and carbon nanotubes and/or carbon nanofibers, containing magnetic powder such as ferrite powder added in the complex.

In this case, the matrix 32 may be made from ferrite. Further, in order to improve the characteristic of the complex 30 as described above, as shown in FIG. 6, magnetic powder 33 such as ferrite powder can be added to the complex, so as to increase the permeability thereof. In this case, the magnetic powder 33 is dispersed in the complex 30. FIG. 6 is a view for showing an inductor according to another embodiment of the present invention, which employs a complex of a matrix and carbon nanotubes and/or carbon nanofibers, containing magnetic powder such as ferrite powder added in the complex.

Figure 7:
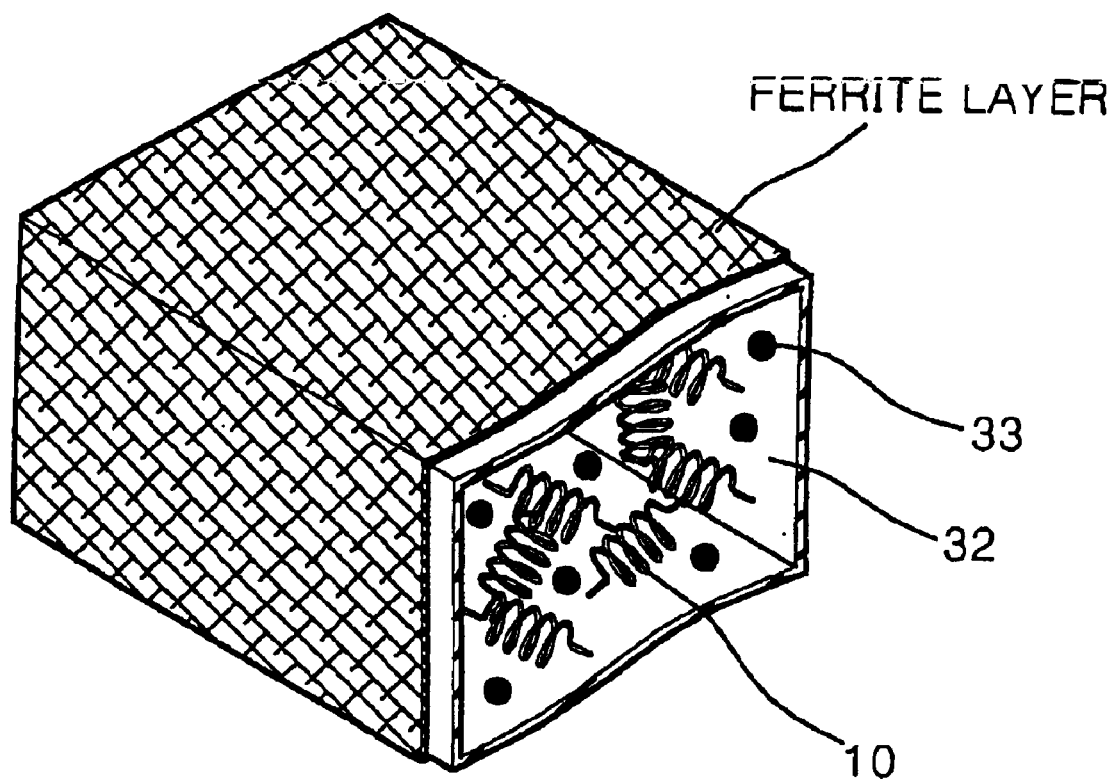
FIG. 7 is a view for showing an inductor according to another embodiment of the present invention, which employs a complex of a matrix and carbon nanotubes and/or carbon nanofibers, together with a ferrite layer applied on the surface of the complex of FIGS. 5 and 6.

In the meantime, FIG. 7 is a view for showing an inductor according to another embodiment of the present invention, which employs a complex of a matrix and carbon nanotubes and/or carbon nanofibers, together with a ferrite layer applied on the surface of the complex of FIGS. 5 and 6. In this case, the magnetic layer such as the ferrite layer formed on the surface of the complex may be a thick film or a thin film.

Meanwhile, the electric characteristic of each of the inductors employing carbon nanotubes and/or carbon nanofibers as shown in FIGS. 2 to 7 depends on the electric characteristic of each of the carbon nanotubes and/or carbon nanofibers. Further, the electric characteristics of the carbon nanotubes and/or carbon nanofibers having the shape of the coils depend on the diameters and the Chirality of the coils. Therefore, the electric characteristic of the inductor can be adjusted by controlling the construction of the growing carbon nanotubes and/or carbon nanofibers, which can be controlled by controlling the synthesis conditions.

Moreover, the carbon nanotubes and/or carbon nanofibers having the shape of the coils can be doped with elements such as phosphorus P, boron B, silicon Si, and nitrogen N. Further, the electric characteristics of the carbon nanotubes and/or carbon nanofibers are different according to the kind and the quantity of the doping elements.

According to the present invention as described above, since the carbon nanotubes and/or carbon nanofibers synthesized by a synthesizing method such as a thermal decomposition method are employed in an inductor of the invention, an inductor having a high inductance even in a minute circuit of a nano-size or a micro-size can be achieved. Further, a mass production of the inductors at a low cost can be enabled.

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention.

What is claimed is:

1. An inductor comprising:
   a substrate;
   a plurality of catalysts located on the substrate, wherein the catalysts include transition metals, and the catalysts comprise a plurality of crystal faces; and
   carbon nanotubes and/or carbon nanofibers synthesized between the catalysts, wherein the carbon nanotubes and/or carbon nanofibers are grown on the crystal faces of the catalysts, the carbon nanotubes and/or carbon nanofibers being entangled with each other, thereby growing in a shape of a coil.

2. An inductor as claimed in claim 1, wherein each of transition metals is selected from the group consisting of iron (Fe), nickel (Ni), and cobalt (Co).

3. An inductor as claimed in claim 1, wherein the carbon nanotubes and/or carbon nanofibers are formed by one of a thermal decomposition method, a catalyst thermal decomposition method, a plasma vapor deposition method, and a hot-filament vapor deposition method.

4. An inductor as claimed in claim 1, wherein the carbon nanotubes and/or carbon nanofibers are doped with elements such as phosphorus (P), boron (B), silicon (Si) and nitrogen (N).

5. The inductor of claim 1, wherein a characteristic of adsorption of one of the crystal faces is different from the characteristic of adsorption of other crystal faces, and a growing speed of carbon on the crystal faces of the catalysts is controlled in accordance with the characteristic of adsorption of one or more of the crystal faces.

6. The inductor of claim 5, wherein each of the transition metal is selected from the group consisting of iron (Fe), nickel (Ni), and cobalt (Co).

7. The inductor of claim 5, wherein the carbon nanotubes are grown by a thermal decomposition process comprising:
   putting a powder of metal in a container;
   heating the container to a temperature between 680° C. and 1500° C. during an effective heating time; and
   injecting a mixture of an effective amount hydrogen per on minute and an effective amount of acetylene per one minute, and maintaining an appropriate hydrogen pressure and an appropriate acetylene pressure.

8. The inductor of claim 7, wherein the heating time is 15 minutes, the hydrogen pressure is 48,000 Pascal and the acetylene pressure is 6,650 Pascal.

* * * * *